UNITED STATES PATENT OFFICE.

EPHREM VIENS, OF BRITANNIA HEIGHTS, NEPEAN TOWNSHIP, ONTARIO, CANADA.

COMPOSITE BUILDING MATERIAL.

1,314,772.     Specification of Letters Patent.     Patented Sept. 2, 1919.

No Drawing.     Application filed June 2, 1919. Serial No. 301,334.

*To all whom it may concern:*

Be it known that I, EPHREM VIENS, a citizen of the Dominion of Canada, residing at Britannia Heights, township of Nepean, county of Carleton, Province of Ontario, Canada, chemist, have invented a new and useful Composite Building Material, of which the following is a specification, such as will enable others skilled in the art to which it appertains to make and use same.

Building materials of similar description heretofore known do not possess the essential characteristic of holding nails or screws and the chief object of my invention is to provide a material possessing all the necessary qualities of such building materials and having the additional quality of firmly holding nails and screws driven therein as will be more fully hereafter described.

My material is fireproof, resilient and has the quality of taking in nails, tacks or screws like wood and has even greater power than the latter to hold the same. It may be used over concrete, tile or other material as a base to which a wooden floor may be nailed. It may be used with a reinforcement instead of concrete, tile or other material to which a wooden floor may be nailed. It may be used in block or brick form in a wall or around openings or wherever nails or screws have to be driven. It may be used with a reinforcement as a roofing material to which a metal shingle or other kind of roofing material may be nailed or fastened. Further, it may be used as a flooring in itself by treating the surface with a hardener, a filler and paint, varnish or wax, or on the hardened surface linoleum may be laid and glued.

The material may be applied in a plastic state similar to the way in which concrete is applied or it may be molded into any desired shape and put into position.

My material, which I call Nailacrete, is composed of the following ingredients: Portland cement, a non-combustible fiber, hydrated lime, a silicious material and sawdust or an equivalent.

The proportions of the above ingredients of my material vary for different classes of work depending on the strength required and the intended application of the material. The proportions herein specified are all by weight, not by volume.

Portland cement _____ 30 to 65 per cent.
Non-combustible fiber (asbestos, or one similar) __ 10 " 55 " "
Hydrated lime _____ 2 " 10 " "
Silicious material (diatomaceous earth, sand, etc.) _____ 2 " 15 " "
Sawdust or an equivalent (cork, rice polishings, etc.) _____ 2 " 10 " "

The mixture is gaged with a sufficient quantity of water to give a quaking consistency and thoroughly mixed to assure a uniform product.

The strength of my material with respect to its power to hold nails is clearly indicated by the following table which has been carefully worked out. The size of the nail used in each case was 2 inches in length and the depth driven 1.5 inches.

| Material. | Force in pounds to pull nail. |
|---|---|
| Bass-wood | 47 |
| Spruce | 47 |
| Pine | 67 |
| Hemlock | 153 |
| Ash | 223 |
| Birch | 263 |
| Red oak | 336 |
| Maple | 430 |
| My weakest material | 40 |
| My strongest material | 480 |

From the above table it will be seen that it requires a force of 50 pounds greater to pull a nail from my material than from maple which possesses this characteristic to the greatest degree of the woods tested.

The following table gives the minimum and maximum tensile, transverse and compressive strength of my material in pounds per square inch:

| Strength. | Minimum. | Maximum. |
|---|---|---|
| Tensile | 70 | 558 |
| Transverse | 100 | 360 |
| Compressive | 200 | 2,466 |

I will now describe in detail four specific types of my composite material and will give the particular properties which specially adapt them for the purposes indicated:

1. As a material to be used as a base which requires to retain the nails or screws driven therein extra firmly, the following composition is used:

| | |
|---|---|
| Portland cement | 50 per cent. |
| Asbestos fiber or equivalent | 35 " " |
| Diatomaceous earth or equivalent | 5 " " |
| Hydrated lime | 5 " " |
| Sawdust or equivalent | 5 " " |

2. If a material used for the same purpose as No. 1 is required, but of medium strength with respect to the holding of nails or screws, I use the same proportions and the same ingredients with the exception of diatomaceous earth or equivalent which is replaced by sand passing a ten mesh sieve.

In the mixing of the compositions No. 1 and No. 2, approximately 44 per cent. of water is required to give the proper consistency for application.

3. The material I preferably use for flooring has the following composition:

| | |
|---|---|
| Portland cement | 60 per cent. |
| Asbestos fiber or equivalent | 15 " " |
| Diatomaceous earth or equivalent | 10 " " |
| Hydrated lime | 10 " " |
| Sawdust or equivalent | 5 " " |

4. If a weaker material than that described in No. 3 meets the requirements and purposes of a particular flooring, I use the same proportions as in No. 3 and the same ingredients with the exception of diatomaceous earth or equivalent which is replaced by sand passing a ten mesh sieve.

In mxing the compositions of No. 3 and No. 4 approximately 42 per cent. of water is required to give the proper consistency for application.

The following table gives the various strengths of the above four compositions:

| | Tensile. | Transverse. | Compressive. | Nail pulling. |
|---|---|---|---|---|
| No. 1 | 363 | 347 | 1,720 | 480 |
| No. 2 | 325 | 233 | 900 | 250 |
| No. 3 | 425 | 360 | 2,466 | |
| No. 4 | 445 | 350 | 1,875 | |

It will be obvious that the percentage composition of my material varies within comparatively wide limits and that my invention is limited only by the terms of the annexed claims and the prior state of the art.

What I claim and desire to secure by Letters Patent of the United States is:

1. As a composite of matter, a resilient, fireproof building material, comprising the following ingredients: Portland cement, a non-combustible fiber, hydrated lime, a silicious material and sawdust.

2. As a composition of matter, a resilient, fireproof building material comprising the following ingredients: Portland cement, asbestos fiber, hydrated lime, diatomaceous earth and sawdust.

3. As a composition of matter, a resilient, fireproof building material having the following composition: Portland cement, 30 to 65 per cent.; asbestos fiber, 10 to 55 per cent.; hydrated lime, 2 to 10 per cent.; silicious material, 2 to 15 per cent.; sawdust, 2 to 10 per cent.

4. As a composition of matter, a resilient, fireproof building material having the following composition: Portland cement, 30 to 65 per cent.; asbestos fiber, 10 to 55 per cent.; hydrated lime, 2 to 10 per cent.; diatomaceous earth, 2 to 15 per cent.; sawdust, 2 to 10 per cent.

5. As a composition of matter, a resilient, fireproof building material composed of Portland cement, a non-combustible fiber, hydrated lime, a silicious material and sawdust, and which requires a force of approximately 450 pounds to pull therefrom a 2 inch nail driven 1.5 inches therein.

6. As a composition of matter, a resilient, fireproof building material composed of Portland cement, asbestos fiber, hydrated lime, diatomaceous earth and sawdust, and, which requires a force of approximately 450 pounds to pull therefrom a 2 inch nail driven 1.5 inches therein.

Signed at Ottawa, Canada, the 12th day of May, 1919.

E. VIENS.